Figure 1:
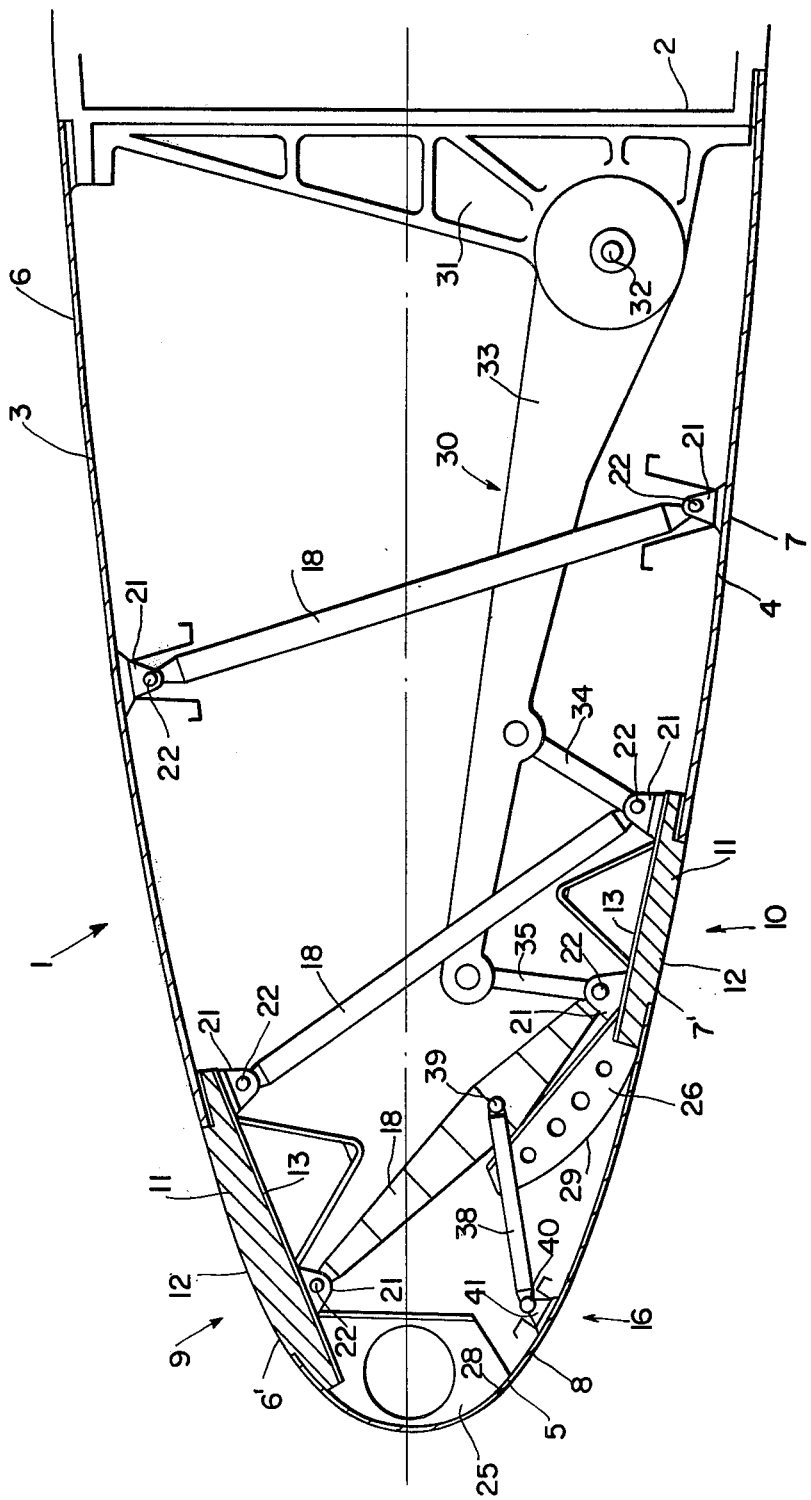

United States Patent [19]

Zimmer

[11] 4,252,287
[45] Feb. 24, 1981

[54] TRANSVERSE FORCE-CONNECTED BODY WITH VARIABLE PROFILING, PARTICULARLY AN AIRPLANE WING

[75] Inventor: Herbert Zimmer, Friedrichshafen, Fed. Rep. of Germany

[73] Assignee: Dornier GmbH, Fed. Rep. of Germany

[21] Appl. No.: 44,400

[22] Filed: May 31, 1979

[30] Foreign Application Priority Data

Mar. 1, 1979 [DE] Fed. Rep. of Germany ....... 2907912

[51] Int. Cl.³ .............................................. B64C 3/48
[52] U.S. Cl. .................................... 244/219; 244/214
[58] Field of Search ................. 244/213, 214, 215, 219

[56] References Cited

U.S. PATENT DOCUMENTS

| | | | |
|---|---|---|---|
| 1,225,711 | 5/1917 | Holle | 244/219 |
| 2,343,986 | 3/1944 | Leutholt | 244/214 |
| 3,716,209 | 2/1973 | Pierce | 244/219 |
| 3,836,099 | 9/1974 | O'Neill et al. | 244/214 |
| 3,994,452 | 11/1976 | Cole | 244/214 |
| 4,040,579 | 8/1977 | McKinney | 244/214 |
| 4,171,787 | 10/1979 | Zapel | 244/214 |

Primary Examiner—Charles E. Frankfort
Attorney, Agent, or Firm—James E. Bryan

[57] ABSTRACT

This invention relates to an improvement in a transverse, force-connected body with variable profiling, particularly an airplane wing, containing flexible upper, lower, and nose skin parts and supporting elements hingedly engaging thereat in conjunction with a control gear, the improvement comprising clamps securing the upper and lower flexible skin parts at a rigid part of the wing, rigid carriers in the upper and lower areas of the wing, and shaped profile elements on the upper and lower carriers, the shaped profile elements having outwardly-pointing shaped profile surfaces for the selective support of the flexible skin parts.

2 Claims, 2 Drawing Figures

TRANSVERSE FORCE-CONNECTED BODY WITH VARIABLE PROFILING, PARTICULARLY AN AIRPLANE WING

The present invention relates to transverse, force-connected bodies with variable profiling, particularly airplane wings, including flexible skin parts and supporting elements hingedly engaging therein in conjunction with a control or adjusting gear.

Airplane wings or airfoils should have maximal lift values and favorable glide ratios under very different operating conditions, for example during take-off and landing, during climb, and during cruising flight. In order to make it possible to obtain the requirements called for, the wing or airfoil camber should be variable, corresponding to the variable operating conditions because a large profile camber which is advantageous, for example, for take-off and landing will lead to high aerodynamic drag during cruising flight.

In order to arrive at wing constructions which allow for an adaptation with respect to varying operating conditions, wings have become known in the art which have flexible skins and movable profile parts at the leading and/or trailing edge in conjunction with control gears. The control gears therein are kinematic systems involving a greater or lesser expenditure which engage at the flexible skin of the wings.

It has further already been proposed, particularly for thin wings, to provide the upper and underside as well as the profile nose of the skin of wings in the manner of a link chain with hingedly interlocking link parts so that the profile camber and the nose radius can be favorably adapted to the respective operating conditions.

It is the object of the present invention to achieve a wing construction with the possibility of altering the profile form or shape, particularly the possibility of varying the nose radius in conjunction with the change of the profile camber while simultaneously improving the functional or operational reliability of the co-acting wing parts and of the control gear.

This object is obtained, according to the present invention, by virtue of the fact that the flexible skin of the upper and underside and of the profile nose is rigidly clamped in at stationary parts of the wing, that secured to the flexible skin in the area of the profile upper side and the profile underside are rigid carrier parts, and that the carriers carry shaped profile parts whose outwardly-pointing shaped profile surface serves for the selective lying on of the flexible skin.

Achieved with the aid of the inventive construction is that the nose radius can be adapted to the respectively most favorable profile form or shape (profile thickness and profile camber). The profile form or shape is closed on all sides in such a construction and has no transitional gaps or connecting gaps through which the aerodynamic drag could be increased. Moreover, avoided thereby is that parts of the flexible skin or parts of the flexible skin and stationary parts must be guided so as to be movable within each other for purposes of a longitudinal adjustment with camber change. As a result thereof functional or operational distrubances during a change in camber are largely eliminated and the rigidity of the wing is assured in each of the possible positions thereof.

In a further embodiment of the present invention, it is moreover provided that the flexible skin be formed of several skin sections in connection with each other, and further that inserted between two skin sections each be the carrier parts whose upper side form parts of the circumflown wing profile. This construction renders possible a significant saving in weight and results in a high degree of profile rigidity in all of the possible camber changing positions of the wing profile. In additon thereto, there results a considerably simplified manufacture and easier assembly.

Furthermore it is a feature of the present invention that the control gear engages by way of a parallelogram guide at one or several of the carrier parts. Achieved thereby is a precise determination of the camber path and additionally a high degee of profile rigidity in all of the displacement positions of the wing profile.

Figure 2:
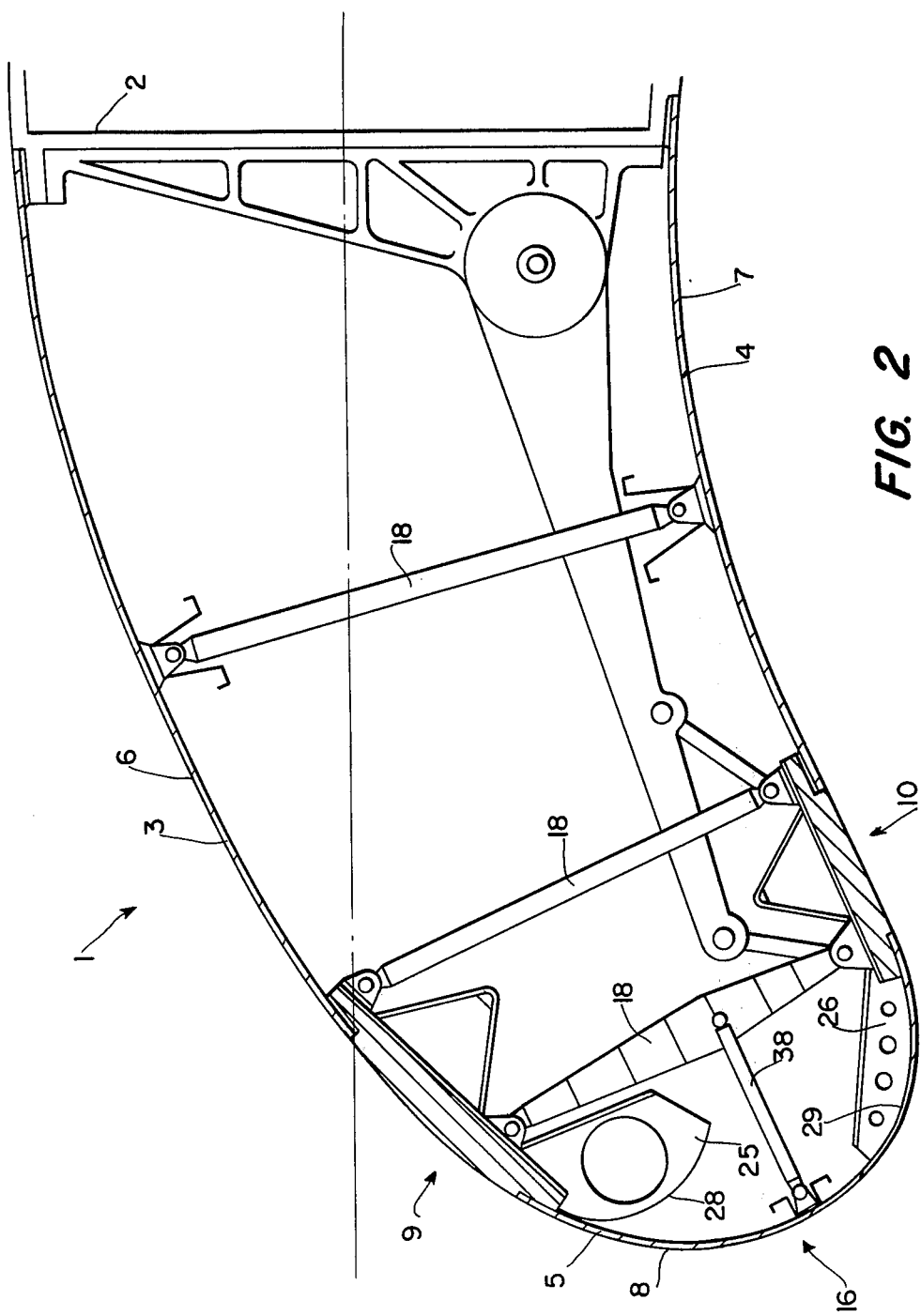

One embodiment according to the present invention will now be described in detail hereinafter with reference to the accompanying drawings, wherein FIG. 1 illustrates in a schematized cross-section the forward section of an airplane wing with a profile form for cruising and high-speed flight, and FIG. 2 illustrates in the same cross-section as in FIG. 1 the wing with a profile form for slow-speed flight and for take-off and landing.

As is apparent from the drawings, reference numeral 1 identifies the wing as a whole. The profile section shown contains the forward or front wing spar 2 and rigidly adjacent thereto is at the upper and underside one flexible skin segment each 3 and 4 with its wing surface 6 and 7 being positioned in the flow. The skin segments 3 and 4 are connected with one carrier 9 and 10 each which is provided as a sandwich structural part with one honeycomb core 11 each and an upper and lower wall 12 and 13. The outside of the upper wall 12 of the carriers 9 and 10 is provided for the flow thereabout and therewith forms a section 6' and 7' for the wing surface 6 and 7.

Rigidily clamped in at both carriers 9 and 10 is another flexible skin segment 5 with its profile surface 8 positioned in the flow, which segment forms the wings nose and the leading wing edge 16.

For the purpose of reinforcing the profile and for determining the profile thickness and the profile camber, the supporting elements 18 are interposed between the upper and lower flexible skin segments 3 and 4, and between the upper and lower carrier 9 and 10, which supporting elements engage by way of hinges at the skins. Provided for this purpose at the carriers and skins are the bearing lugs 21, and the supporting elements 18 engage therein hingedly by way of the bearing bolts 22.

The carriers 9 and 10 serve for receiving a plurality of shaped profile pieces 25 and 26 which are disposed in the manner of ribs distributed over the wing span. The shaped profile pieces 25 and 26 have outwardly-directed profile surfaces 28 and 29 against which latter there will come to rest, selectively and loosely, according to FIGS. 1 and 2, the coordinated segment 5 of the flexible skin, corresponding to the profile shape or form which is to be set.

Provided for the purpose of changing the profile shape or form, i.e. the profile camber and the profile thickness, as well as the nose radius, is a selectively actuatable control gear 30 engaging in the profile. Only the part of the gear which is accomodated within the flexible skin 3, 4, and 5 has been shown in the drawings for purposes of simplification, and which may be actuated by the pilot by way of a torsion drive (torsion bar at 32 and planetary-type reduction gear at each rocking lever 33 about the torsion bar), or hydraulic control members. The gear 30 includes the bearings 31 being rigid, or rigidly disposed, at the spar 2 which serve for rotatably receiving the axles 32 extending in the direction of the span of the wing 1, and the axles 32 rigidly carry a plurality of rocking levers 33. Positioned at the rocking levers 33 are the levers 34 and 35 at a distance from each other, which latter engage hingedly at the carrier 10 in the form of a parallelogram guide by way of the bearing lugs 21 and the bearing bolts 22. For the purpose of supporting the camber setting and the camber radius of the flexible skin segment 5 of the profile nose 16, there is arranged at the supporting element 18—between the flexible skin segment 5 and the foremost supporting element 18 by way of a bearing lug 41 and a bearing bolt 40, and a bearing bolt 39—a leading edge supporting element 38 which acts in the manner of the other supporting elements 18, which will be further explained hereinbelow.

The operation of the inventive constuction described herein is as follows:

As has already been set forth hereinabove, a closed cover or skin being selectively adjustable into different profile forms or shapes and representing the wing profile is formed by means of the flexible skin segments 3, 4 and 5, the carriers 9 and 10, as well as the forward wing spar 2.

By turning the axles 32, the rocking levers 33 are displaced at a right angle to the wing plane, and thereby a force is exerted, by way of the transmission levers 34, 35 and the lower carrier 10, upon the flexible skin segments 3, 4 and 5 in the sense of a movement about their fixed clamping at the wing spar 2. The flexible skin segments 4 and 5 will thereby alter their camber depending upon the degree of the displacing movement, and a change of the nose radius of the nose part 16 is effected at the same time. Determined by means of the supporting elements 18 and 38 being hingedly disposed between the flexible skins is the profile thickness at the pivotal profile thickness at the pivotal points 21, 22 and 41. Due to the fixed clamping-in of the upper and lower flexible skin segments 3 and 4 with the adjacent skin segment 5 and the relative parallel displacement of the upper and lower skin segments produced as a result of the clamping-in and displacement, the nose radius will change of necessity. The radius camber path of the profile nose 16 is therein determined by the selective lying of the flexible planking skin 5 on the shaped profile surface 28 and 29 of the upper and lower shaped profile part 25 and 26, depending upon the displacing direction in positions according to FIGS. 1 and 2 and any possible intermediate positions. The change in inclination of the supporting elements 18 thereby taking place due to the relative displacement of the pivotal points 21, 22 and 41 with the displacement of the flexible skin segments 3 and 4 with respect to each other determines the thickness of the profile within the area of the supporting elements 18 and 38.

It will be obvious to those skilled in the art that many modifications may be made within the scope of the present invention without departing from the spirit thereof, and the invention includes all such modifications.

What is claimed is:

1. In a transverse, force-connected body with variable profiling, particularly an airplane wing, containing separate, individually flexible upper, lower, and nose skin parts and supporting elements hingedly engaging thereat in conjunction with a control gear, the improvement comprising means clamping the upper and lower flexible skin parts at a rigid part of the wing, said skin parts forming the wing upper side, lower side, and leading edge, rigid carrier means interposed between said upper skin part and said nose skin part, and between said lower skin part and said nose skin part.

shaped profile means on each of the upper and lower carrier means, said shaped profile means having outwardly-pointing shaped profile surfaces for the selective profiling engagement and support of said flexible skin parts, and means whereby said rigid carrier means can be adjusted in the direction of the wing section and in the direction of the chord, with respect to one another.

2. A transverse, force-connected body according to claim 1 in which outer sides of said rigid carrier means form parts of said wing surface.

* * * * *